United States Patent

[11] 3,628,423

| [72] | Inventor | Richard Warren Dymond |
| | | Rochester, Mich. |
| [21] | Appl. No. | 872,575 |
| [22] | Filed | Oct. 30, 1969 |
| [45] | Patented | Dec. 21, 1971 |
| [73] | Assignee | TRW, Inc. |
| | | Warren, Mich. |

[54] POWER BRAKE BOOSTER
4 Claims, 2 Drawing Figs.

[52] U.S. Cl.................................................. 91/376,
 91/376
[51] Int. Cl..................................................... F15b 9/10
[50] Field of Search........................................... 91/372,
 373, 376

[56] References Cited
UNITED STATES PATENTS

| 2,544,042 | 3/1961 | Pontius............... | 91/372 |
| 2,761,427 | 9/1956 | Shumaker............ | 91/373 |
| 2,779,314 | 1/1957 | Vorech............... | 91/372 |

*Primary Examiner*—Paul E. Maslousky
*Attorney*—Hill, Sherman, Meroni, Gross & Simpson

ABSTRACT: A power brake booster uses high-pressure hydraulic fluid as an energy source. A piston and rod assembly is guided by coaxial bores in a housing. Valve means for controlling the operation of the booster are contained within the piston and rod assembly and are actuated in response to movement of an input rod adapted to be connected through a brake pedal. The flow of hydraulic fluid from a high-pressure port through the valve mechanism is regulated through a working chamber behind the piston and from the working chamber to a low-pressure port adapted to be connected to the reservoir or tank of the hydraulic system. The output rod of the piston is connected to a master cylinder assembly.

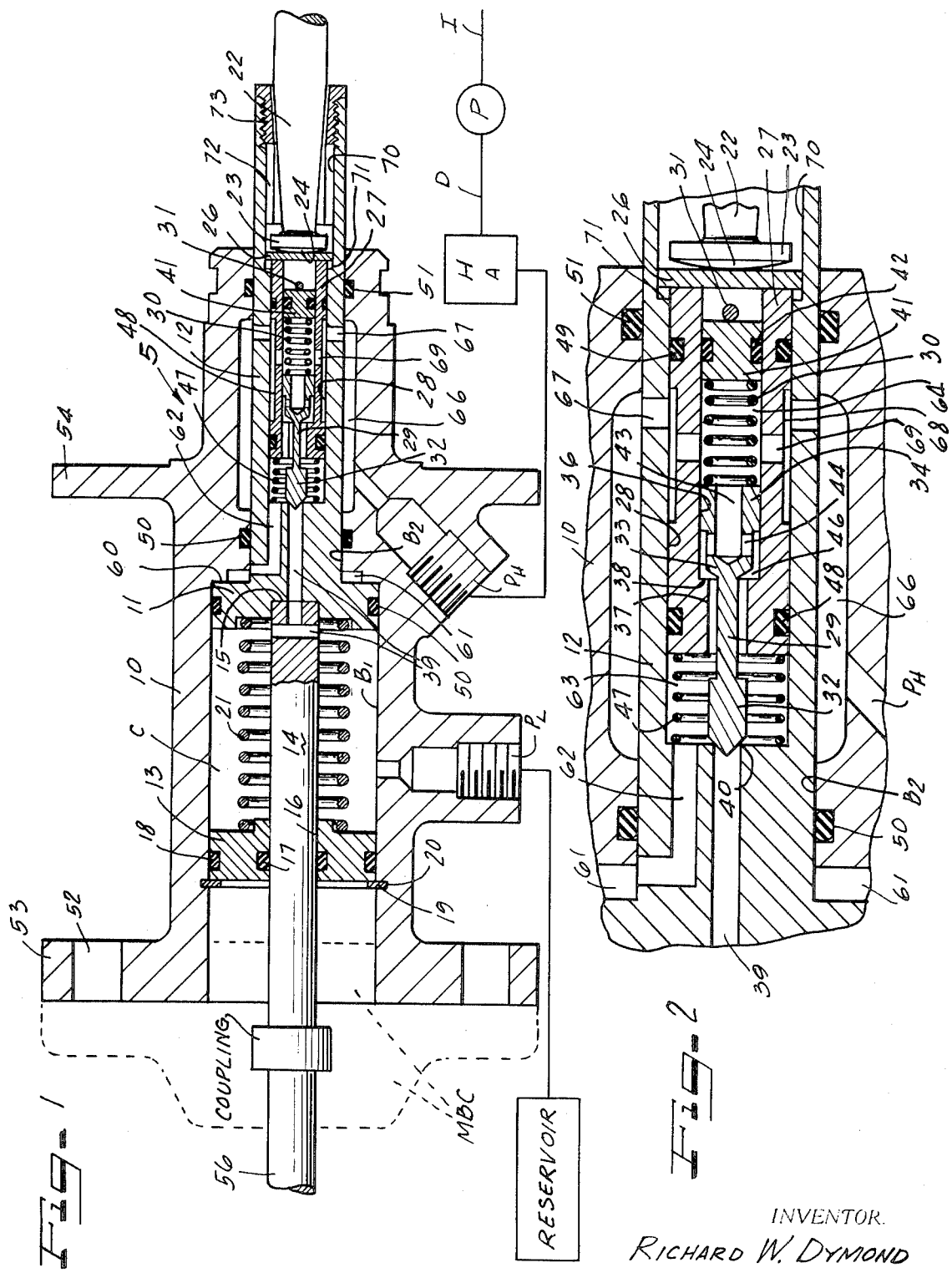

POWER BRAKE BOOSTER

FIELD OF THE INVENTION

This invention relates generally to an automotive power brake booster and more particularly to a power brake booster utilizing high-pressure hydraulic fluid as the energy source.

THE PRIOR ART

Current automotive power brake boosters are of the vacuum-suspended type relying on atmosphere pressure against a diaphragm to produce the desired output force. Since the maximum working pressure is thus limited to 14.7 pounds per square inch, conventional booster units become very large and bulky due to the large diaphragm required.

SUMMARY OF THE INVENTION

In accordance with the principles of the present invention, a power brake booster utilizes high-pressure hydraulic fluid as the energy source. A piston and rod assembly guided by the coaxial bores of a housing includes valve means which control the operation of the booster and which are contained within the piston and rod assembly. A booster output rod is mechanically linked between the piston and rod assembly and with the piston in a master cylinder assembly. A high-pressure port is connected through a hydraulic accumulator that has been charged with fluid at high pressure and the low-pressure port is connected through the system reservoir or tank.

When the vehicle operator applies the brakes, an input rod acting through a thrust plate urges a movable valve sleeve so that a metering pin will come into contact with a first seat thereby sealing the working chamber behind the piston from a tank port. Any further travel of the rod will cause the metering pin to unseat at a second location thereby admitting high-pressure fluid into the working chamber. When braking requirements are satisfied and the vehicle operator stops movement of the brake pedal, the movable sleeve of the valve mechanism also stops whereupon the metering pin will be seated at two locations, thereby permitting the piston and rod assembly to remain stationary as long as the force on the input rod is held constant.

When the vehicle operator removes force from the input rod, the metering pin will become reseated at one location and unseated at the other, thereby communicating the working chamber with the tank port. Fail-safe means are provided so that the input rod may act directly through the assembly through the output rod. Further accidental withdrawal of the input rod is prevented by a split bushing and retaining nut assembly.

DESCRIPTION OF THE DRAWINGS

FIG. 1 is a somewhat diagrammatic view of a high-pressure hydraulic fluid system of an automotive vehicle and in which a power brake booster provided in accordance with the principles of the present invention is shown in cross section with parts thereof in elevation; and FIG. 2 is a view similar to FIG. 1 but with the valve means for controlling the operation of the booster shown in enlarged form.

DESCRIPTION OF THE PREFERRED EMBODIMENTS

The power brake booster of the present invention finds particular utility in application to an automotive vehicle of the type having a high-pressure hydraulic fluid system. In such a system there may be located a pump shown by the legend P having an input I and a discharge D communicating with a hydraulic accumulator shown by the legend HA. The hydraulic system may also include a reservoir shown by the legend "reservoir."

In accordance with the principles of the present invention, a power brake booster is provided which is shown generally at 5. The booster comprises a housing 10 which has coaxial circular bores $B_1$ and $B_2$ as well as a high-pressure port $P_H$ connected to the hydraulic accumulator and a low-pressure port $P_L$ connected to the reservoir. A piston and rod assembly comprises a piston head 11 and axially extending rod 12 which are guided respectively by the concentric bores $B_1$ and $B_2$ in the housing 10.

A plug 13 closes the end of the bore $B_1$, thereby forming a cylinder C in which the piston head 11 moves. A booster output rod 14 is connected to the piston head 11 as at 15 and projects axially outwardly of the cylinder C, being slidably supported by the plug 13 at a bearing surface formed by an opening in the plug shown at 16. The plug 13 is appropriately recessed to receive a sealing member 17 which seals against the peripheral surface of the output rod 14. The peripheral surface of the plug 13 is also recessed to receive a sealing member 18, thereby forming a seal with the wall of the bore $B_1$. The plug 13 is restrained against movement outwardly of the bore $B_1$ by a retaining ring 19 received in a recess 20 formed in the housing radially outwardly of the bore $B_1$. A coil spring 21 has one end bottomed against the plug 13 and the other end is bottomed against the head of the piston 11, thereby preloading the piston and rod assembly to the right, using the orientation of FIG. 1.

Valve means for controlling the operation of the booster are contained within the piston and rod assembly 11, 12 and are clearly shown in the enlarged drawing of FIG. 2.

A booster input rod is shown at 22 and is adapted to be connected to a brake pedal for actuation by a vehicle operator. The booster input rod 22 has an enlarged head portion 23 formed with an abutment surface 24 engageable with a thrust plate 26. The thrust plate 26 contacts a slidable valve sleeve 27 which is slidable within the piston and rod assembly, more specifically, the movable valve sleeve 27 being slidably supported by the walls of a bore 28 formed in the rod 12.

The movable valve sleeve 27 contains a metering pin 29, a spring 30, a plug 41 and a retaining pin 31.

Referring to the metering pin 29, it will be noted that the metering pin is an elongated member having a first valve head 32 at one end thereof and a second valve head 33 axially spaced therefrom. A cylindrical guide portion 34 is also formed on the metering pin and slidably engages the adjoining walls of a recess 36 formed in the valve sleeve 27 as a counterbore in the sleeve. The sleeve has a reduced diameter bore shown at 37 so that the shoulder between the respective bore 37 and the counterbore 36 forms a valve seat 38 for the valve head 33.

The rod 12 has a centrally disposed passage formed therein intersecting the bore 28 as shown at 39 and the end of that passage 39 forms a valve seat 40 for the valve head 32.

A plug 41 closes the counterbore 36 and is retained in place by the pin 31 which extends through the walls of the valve sleeve 27. The plug 41 is peripherally recessed to receive a sealing member 42. The metering pin 29 is preloaded by the biasing means provided by the coil spring 30 since one end of the coil spring 30 is bottomed against the plug 41 and the other end of the coil spring 30 is bottomed against the end of the metering pin 29 at the cylindrical portion 34.

A passage 43 is formed in the metering pin and extends axially inwardly of the end thereof and opens radially outwardly through a passage 44 into an area 46 surrounding the valve head 33.

A coil spring 47 has one end bottomed against the rod 12 and the other end is bottomed against the end of the valve sleeve 27. The valve sleeve 27 has peripheral recesses at opposite ends thereof for receiving corresponding sealing members shown at 48 and 49. The housing is also recessed at spaced points along the bore wall $B_2$ thereby to receive sealing members shown at 50 and 51.

There is shown in dotted lines a master brake cylinder designated MBC and which can be piloted into the bore $B_1$ and secured by bolts or other suitable fastening means through appropriate openings 52 formed in a flange 53 at one end of the housing 10.

A second flange 54 is also provided on the housing, thereby facilitating attachment of the booster assembly to a suitable support member, for example, the engine compartment firewall. It will be understood that the booster output rod mechanically links the piston and rod assembly 11, 12 to the piston in the master cylinder assembly MBC. Thus, there is shown a coupling identified by legend connecting the output rod 14 with a part corresponding to the piston in the master cylinder assembly and which part is identified at 56.

In operation, it will be understood that the hydraulic accumulator will be charged with hydraulic fluid at high pressure, for example, up to 1,000 pounds per square inch.

In the idle position, i.e., with no internal force applied to the input rod 22, the spring 21 will position the piston and rod assembly 11, 12 to the extreme right, using the orientation of FIGS. 1 and 2. The spring 47 will move the sleeve 27 to the right so that the metering pin 29 will seat at the head 33 and the valve seat 38 while remaining unseated at the head portion 32 and the valve seat 40.

A stop shoulder is shown at 60 and a recess at 61 behind the piston head 11, thereby forming a working chamber in the cylinder C behind the piston into which pressurized fluid may be directed via a passageway 62 leading to a chamber 63 surrounding the valve head 32. The working chamber 61 is thus connected to the low-pressure tank port $P_L$ through the passage 62, the chamber 63, the passages 39 and the chamber C.

High-pressure fluid introduced at the port $P_H$ is communicated to the chamber 64 through an annular recess 66 formed in the housing 10 in surrounding relationship to the rod 12 and through one or more radial passages 67 formed in the wall of the rod 12 thereby to communicate with a recess 68 formed in the peripheral wall of the valve sleeve 27. One or more radial openings extend between the recess 68 and the chamber 64 and such radial openings are shown at 69.

The spring 30 and the pressure in the chamber 64 acting on the metering pin 29 will hold the metering pin seated against the valve seat 38 at the valve head 33. Referring to the drawings, it will be noted that for the conditions just described in the idle position, high-pressure fluid is positively sealed at all points to prevent a leakdown of the hydraulic accumulator.

When the vehicle operator applies the brakes, the input rod 22 acts through the thrust plate 26 and thereby urges the valve sleeve 27 toward the left, as viewed in the drawings. After a relatively small amount of travel, the metering pin 29 will come into contact with the valve seat 40 at the valve head 32 sealing the working chamber 61 from the tank port $P_L$. Any further travel of the input rod 22 and the valve sleeve 27 will cause the metering pin 29 to unseat at the valve seat 38 and the valve head 33, admitting high-pressure fluid from the chamber 64 into the chamber 63 and through the passage 62 to the working chamber 61. The flow of fluid into the working chamber 61 causes leftward movement of the piston head 11 and the rod assembly 12 and will thereby move the output rod 14 and such movement continues as long as the input rod 22 follows the piston and rod assembly 11, 12.

When braking requirements are satisfied, the vehicle operator stops forward movement of the brake pedal and thus the input rod 22. When movement of the input rod 22 stops, the movement of valve sleeve 27 also stops but the metering pin 29 being seated at the valve seat 40 and the valve head 32 will still allow the high-pressure fluid to flow to the chamber 61 to continue to move the piston and rod assembly 11, 12 toward the plug 13. As the piston and rod assembly move to the left, the metering pin will move therewith until the valve head 33 is seated on the valve seat 38 to prevent further passage of the high-pressure fluid to the working chamber. The piston and rod assembly 11, 12 will now remain stationary as long as the force on the input rod 22 is held constant.

When the force applied to the input rod 22 is removed, the metering pin 29 will become seated at the seat 38 and the valve head 33 and unseated at the valve seat 40 and the valve head 32, thus communicating the working chamber 61 with the low-pressure tank port $P_L$. The force from the spring 21 will urge the piston and rod assembly 11, 12 to move to the right until it reaches the position shown in FIG. 1. Thus, operation of the unit has been described for idle, apply, hold and release modes.

It is desirable to have input and output force proportional so that the vehicle operator has feedback from the brake system. In accordance with the principles of the present invention, the pressure in the working chambers 61 and 63 is the same. The output force is proportional to the pressure times the area of bore $B_1$ minus bore $B_2$. The input force is proportional to the same pressure multiplied by the area of the valve sleeve 27.

It is highly desirable in braking systems to provide the means to "fail safe" in case there is an interruption or loss of hydraulic fluid supply pressure. The present invention affords such means. In this connection, note that the bore 28 is counterbored as at 70 thereby to form a shoulder 71. Travel of the valve sleeve 27 in excess of the travel required for lost motion to seat and unseat the metering pin 29 will result in the thrust plate 26 becoming seated on the shoulder 71. The input rod 22 then acts directly through the thrust plate 26 to the piston and rod assembly 11, 12 and to the output rod 14.

It is also contemplated by the present invention to prevent withdrawal of the input rod 22 inadvertently and in this connection it will be noted there is provided a split bushing 72 and a retaining nut 73. It is important that the input force be proportional to the output force to give the operator "feel" or "feedback" from the system. As will be evident from the foregoing description, both the input and the output forces are proportional to the working pressure and in the ratio of the area of the respective input and output members exposed to the working pressure. Moreover, the ratio can be varied to suit individual requirements by merely changing the area that controls the input force, i.e., the area of the valve sleeve 27. In a typical automotive application, the output force is on the order of approximately five times the input force. Neglecting spring forces, which are relatively small, it is contemplated that the area of the valve sleeve 27 will be equal to approximately one-fifth the area of the difference in areas $B_1$ and $B_2$, i.e., $[B_1 - B_2]$.

Although minor modifications might be suggested by those versed in the art, it should be understood that I wish to embody within the scope of the patent warranted hereon all such modifications as reasonably and properly come within the scope of my contribution to the art.

I claim:

1. A power brake booster comprising:
   a housing having coaxially aligned first and second bores with the first bore being of a greater diameter than the second bore;
   a piston and rod assembly slideably mounted in the coaxial first and second bores respectively with said piston having one surface defining with said first bore a working chamber and another surface defining with said first bore another chamber, said rod of said assembly having an axial bore, said assembly having a first passage extending from the outer surface of the piston and intersecting said axial bore to form a first valve seat therewith and a second passage extending from adjacent to said one surface of said piston to said axial bore, and said assembly having at least one radial opening between said axial bore and the exterior surface of said rod of said assembly;
   a high-pressure port formed in said housing adapted to be connected with an energy source of a high-pressure hydraulic fluid system and communicating with said second bore to provide high-pressure hydraulic fluid through said radial opening to the axial bore of the rod of the piston and rod assembly;
   a low-pressure port formed in said housing adapted to be connected to a reservoir of the hydraulic fluid system and communicating with the other chamber of said first bore;
   a booster output rod connected to said piston and projecting through the closed end of said first bore;

valve means for controlling the operation of said piston and rod assembly of said booster and comprising;

a valve sleeve movably disposed in said axial bore of said assembly and having means defining a second valve seat, a spring-biased metering pin carried in said valve sleeve and having a first and second valve head spaced axially apart from one another with the first valve head coacting with the first valve seat to control flow through said first passage and said second valve head coacting with the second valve seat to control flow through said sleeve, and biasing means preloading said piston and rod assembly and said valve means in one direction to an idle position with said second valve head seated and the first valve head unseated thereby to positively seal the flow path between said ports; and an input rod for selectively actuating said valve sleeve, as a function of braking requirements by contacting said sleeve whereby movement of said valve sleeve will seat said first valve head to prevent flow of fluid through the first passage and unseat said second valve head thereby enabling the flow of the high-pressure hydraulic fluid through said axial bore, said sleeve into said working chamber behind said piston to move said piston and rod assembly and said output rod toward the closed end of said first bore, stoppage of the said input rod movement operating to stop the movement of said valve sleeve but allowing said metering pin to seat both of said first and second heads, thereby holding said piston and rod assembly stationary as long as the force on the input rod is held constant, and movement of said input rod in the opposite direction in response to said biasing means upon removing of the input force therefrom operating to seat said second valve head and unseat said first valve head to vent said working chamber through said first passage to said other chamber and through the low-pressure port.

2. A power brake booster according to claim 1, further characterized by said rod of said piston and rod assembly and the input rod having means for coacting together to prevent withdraw of the input rod from said booster unit.

3. A power brake booster according to claim 2, further characterized by fail-safe means comprising a stop member disposed in said axial bore of said piston and rod assembly engageable upon a predetermined movement of said valve sleeve to enable said input rod to act directly on the piston and rod assembly and upon said output rod.

4. A power brake booster according to claim 1, wherein the effective area of the one surface of the piston of the working chamber is equal to the cross-sectional area of the first bore minus the cross-sectional area of the second bore and wherein said valve sleeve has an effective area which is acted on by the high-pressure fluid which is approximately one-fifth of the effective area of the one surface of the piston to provide a feedback force through the input rod to give the operator a feedback feel equal to approximately one-fifth of the force applied by the booster to the output rod.

\* \* \* \* \*